Nov. 10, 1931.   L. W. MACOMBER   1,831,603

SPRAYER

Filed May 18, 1931

INVENTOR
Lynn W. Macomber
BY
Chappell Earl
ATTORNEYS

Patented Nov. 10, 1931

1,831,603

UNITED STATES PATENT OFFICE

LYNN W. MACOMBER, OF BATTLE CREEK, MICHIGAN, ASSIGNOR TO UNITED STEEL & WIRE COMPANY, OF BATTLE CREEK, MICHIGAN

SPRAYER

Application filed May 18, 1931. Serial No. 538,064.

The main object of the invention is to provide a method of and means for reducing a liquid such as water into a finely divided spray.

Another object of the inventon is to provide a sprayer comprising a member having a flat circular surface and means for projecting a stream of water at high velocity onto said surface, whereby the water of the stream is reduced by its own force into a finely divided spray which radiates from said surface.

Still further objects of the invention are to provide means for changing the quantity of water in said stream and means for draining surplus water away from said flat circular surface.

Objects pertaining to details and economies of construction and operation will appear from the description to follow.

A preferred embodiment of my invention is illustrated in the accompanying drawings, in which.

Figure 1:
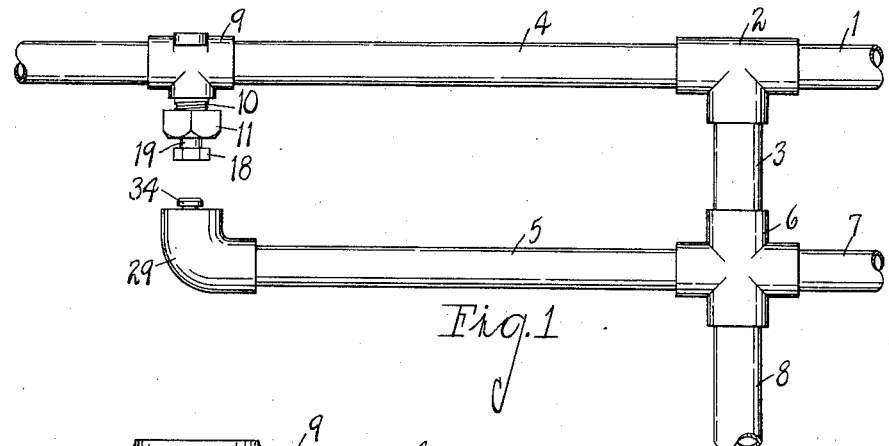
Fig. 1 is an elevational view of a sprayer constructed in accordance with my invention.
Figure 2:
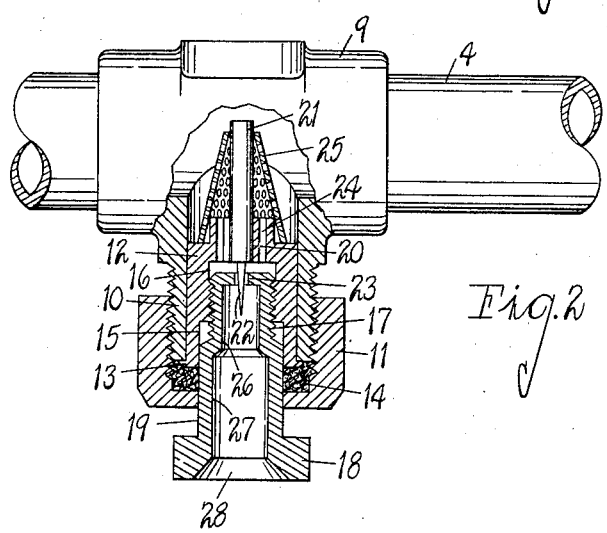
Fig. 2 is a fragmentary view partially in cross section and partially in elevation of the stream projecting device.
Figure 3:
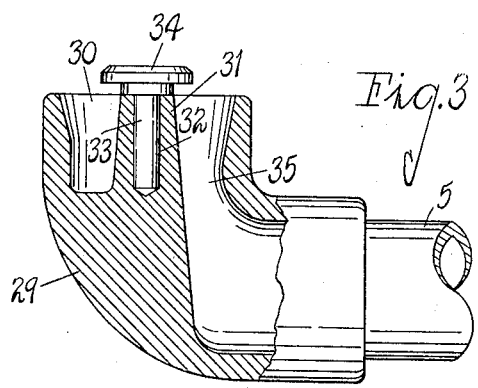
Fig. 3 is a view similar to Fig. 2 of the stream receiving and atomizing device.

Referring to the drawings, the numeral 1 indicates a supply pipe that is connected to any suitable source of supply of water or other liquid under pressure, not shown. The supply pipe 1 is threaded into a T-coupling 2 which is supported by a closed pipe or plug 3. The T-coupling 2 in turn supports a horizontal pipe 4 in spaced relationship to a drain pipe 5 that is also connected to the connecting member 3 by means of a cruciform coupling 6. Pipes 7 and 8 are also connected to the cruciform coupling 6 as shown. One of these pipes may be a supporting pipe and the other may be connected to the drain pipe 5 to carry off water collected therein.

Connected to the supply pipe 4 is a T-coupling 9, which constitutes the body member of the sprayer, its stem portion 10 being externally threaded for the reception of a packing gland 11. A valve member 12 is removably disposed within the body member 9. The valve member 12 is provided with an outwardly extending flange 13 which engages the end of the body member when forced into such position by a ring of packing material 14 within the gland 11. The valve member 12 is hollow and is provided with stepped portions 15 and 16. The inner smaller portion 16 is threaded for coaction with threads provided on the portion 17 of a valve member. The nozzle 18 is provided with a portion 19 that is adapted to slidably and rotatably engage the inner surface of the portion 15 of the valve member. The longitudinal position of the nozzle 18 may be changed relatively to the nipple 10 by turning the nozzle 18.

The valve member 12 is provided with a central hole or opening 20 for the stem 21 of the needle valve 22. The stem 21 is preferably secured in frictional engagement in the opening 20. The valve 22 coacts with the port 23 of the nozzle. A plurality of relatively small water passages 24 are grouped about the valve. A conical screen 25 embraces the rearwardly extending portions of the stem 21 and the nipple 10, respectively, embracing the water passages 24 for preventing foreign matter from entering the jet projecting device. The base of the conical screen 25 preferably rests on the shoulder formed by the rearwardly projecting portion of reduced section of the nipple 10. Also preferably the rear end of the valve stem projects slightly beyond the upper end of a conical screen 25.

The interior of the nozzle 18 is preferably provided with stepped portions 26 and 27 of increasing size, which finally terminate in a flared mouth 28 so that the jet projected from the opening surrounding the pointed needle 22 may pass smoothly and unhampered through the nozzle 18. The nozzle 18 is adapted to protect the jet of water at its inception or beginning from air drafts and the like and minimizes spreading thereof at this point. The jet may be varied by turning the nozzle 18. If it is desired to decrease the quantity of water flowing in the stream and at the same time to increase its velocity, the nozzle 18 is turned so that it is moved inwardly toward the bottom of the nipple 10. This action results in the opening surrounding the pointed needle 22 becoming more restricted, thereby reducing the quantity and increasing the speed of the stream of water projected by the device. The flow of water in the jet may be increased and its velocity correspondingly reduced by turning the nozzle 18 so that it is moved outwardly relative to the nipple 10.

Mounted on the end of the drain pipe 5 directly under the nozzle 18 is a member 29 of L-shape. The upper end of the member 29 is provided with a concentric drain trough 30 surrounding a central stud 31. The central stud 31 is provided with a concentric longitudinal recess 32 for the accommodation of a pin 33 having an enlarged flat head 34 that is disposed so as to lie normal to and directly in the path of the stream of liquid projected by the projecting device from the nozzle 18.

The trough 30 communicates with the pipe 5 by means of a vertical conduit 35 so that any surplus water from the stream that is not atomized and finely divided by the head 34 is readily carried off through the drain pipe 5.

In operation, water is supplied under pressure to the supply pipe 4 where it in turn passes through the screen 25, thence through the water passages 24 in the valve member 10, thence to the space between the rear end of the valve member 10 and the inner end of the nozzle 18 to the port controlled by needle valve 22. The jet of water impinges upon the atomizing disk and is atomized or pulverized into a finely divided spray which radiates or is thrown from the surface of the disk 34.

As pointed out above, any water from the stream that is not finely divided, runs over the disk 34 and into the trough 30 and finally out through the drain pipe 5.

From the above description it will be apparent that I provide simple and economical means for producing a highly efficient spray that reduces a liquid such as water into a finely divided spray. Such sprays are particularly adaptable for use in display racks for keeping vegetables, such as lettuce and celery, fresh and green, a rack of this character being shown in my copending application. Sprays of this character also have many other desirable applications.

It will be understood that, while I have illustrated and described a preferred embodiment of my invention, various changes may be made therein and other embodiments made without departing from the spirit of the invention, which I desire to be limited only by the prior art and the scope of the following claims.

Having thus described my invention, what I claim as new and desire to secure by Letters Patent is:

1. In a sprayer, the combination of an externally threaded tubular body member, a chambered valve member removably fitting within said body member and having a flange at its outer end engaging the outer end of said body member, the inner end of said valve member being shouldered, an outwardly facing needle valve at the inner end of said valve member, said valve member having a plurality of passages grouped about said valve, a conical screen arranged on said shoulder of said valve member, said valve having a stem projecting from the inner end of said valve member to constitute a support for said screen, a chambered nozzle provided with a port at its inner end coacting with said needle valve, a packing including a gland threaded upon said body member to embrace said nozzle and acting to retain said valve member, an atomizing disk disposed in alinement with said nozzle to receive the impact of the jet discharged therefrom, and a support for said impact disk provided with an annular trough surrounding said impact member and with a drain connection for said trough.

2. In a sprayer, the combination of an externally threaded tubular body member, a chambered valve member removably fitting within said body member and having a flange at its outer end engaging the outer end of said body member, the inner end of said valve member being shouldered, an outwardly facing needle valve at the inner end of said valve member, said valve member having a plurality of passages grouped about said valve, a conical screen arranged on said shoulder of said valve member, said valve having a stem projecting from the inner end of said valve member to constitute a support for said screen, a chambered nozzle provided with a port at its inner end coacting with said needle valve, a packing including a gland threaded upon said body member to embrace said nozzle and acting to retain said valve member, and an atomizing disk disposed in alinement with said nozzle to receive the impact of the jet discharged therefrom.

3. In a sprayer, the combination of an externally threaded tubular body member, a chambered valve member removably fitting within said body member and having a flange at its outer end engaging the outer end of said body member, the inner end of said valve member being shouldered, on outwardly facing needle valve at the inner end of said valve member, said valve member having a plurality of passages grouped about said valve, a conical screen arranged on said shoulder of said valve member, said valve having a stem projecting from the inner end of said valve member to constitute a support for said screen, a nozzle having a stepped bore and a flaring mouth threaded into said valve member and provided with a port at its inner end coacting with said needle valve, a packing including a gland threaded upon said body member to embrace said nozzle and acting to retain said valve member, and an atomizing disk disposed in alinement with said nozzle to receive the impact of the jet discharged therefrom.

4. In a sprayer, the combination of an externally threaded tubular body member, a chambered valve member disposed within said body member and having a flange at its outer end engaging the outer end of said body member, an outwardly facing needle valve at the inner end of said valve member, said valve member having a passage at the side of said valve, a nozzle having a stepped bore and a flaring mouth threaded into said valve member for adjustment therein and provided with a port at its inner end coacting with said needle valve, a packing including a gland threaded upon said body member to embrace said nozzle and acting to retain said valve member, and an atomizing member disposed in alinement with said nozzle to receive the impact of the jet discharged therefrom.

5. In a sprayer, the combination of a tubular body member, a chambered valve member disposed within said body member and having a flange at its outer end engaging the outer end of said body member, an outwardly facing needle valve at the inner end of said valve member, said valve member having a passage at the side of said valve, a nozzle threaded into said valve member for adjustment therein and provided with a port at its inner end coacting with said needle valve, an atomizing member disposed in alinement with said nozzle to receive the impact of the jet discharged therefrom, and a support for said impact member provided with a trough and with a drain connection for said trough.

6. In a sprayer, the combination of a tubular body member, a chambered valve member disposed within said body member, an outwardly facing needle valve at the inner end of said valve member, said valve member having a passage at the side of said valve, a nozzle threaded into said valve member for adjustment therein and provided with a port at its inner end coacting with said needle valve, an atomizing member disposed in alinement with said nozzle to receive the impact of the jet discharged therefrom, and a support for said impact member provided with a trough adjacent said impact member and with a drain connection for said trough.

In witness whereof I have hereunto set my hand.

LYNN W. MACOMBER.